United States Patent [19]

Foster

[11] 4,244,352
[45] Jan. 13, 1981

[54] CONTROL SYSTEM FOR SOLAR HEATER

[76] Inventor: Howard L. Foster, 6908 Park Dr., Chattanooga, Tenn. 37421

[21] Appl. No.: 38,302

[22] Filed: May 11, 1979

[51] Int. Cl.³ .............................................. F24J 3/02
[52] U.S. Cl. ...................................... 126/422; 137/59; 126/420; 126/418
[58] Field of Search ............... 126/420, 422, 423, 421, 126/418; 237/2 A, 80; 165/39, 40; 236/42, 43, 91 C, 93 A, 95, 96, 99 F, 99 G, DIG. 1

[56] References Cited

U.S. PATENT DOCUMENTS

| | | | |
|---|---|---|---|
| 624,903 | 5/1899 | Borne et al. ................... | 236/DIG. 1 |
| 1,003,307 | 9/1911 | Walker ................................ | 237/80 |
| 1,696,143 | 12/1928 | Hinchman ..................... | 236/DIG. 1 |
| 1,748,342 | 2/1930 | Grant ............................. | 236/DIG. 1 |
| 2,305,933 | 12/1942 | Soderberg ........................... | 236/91 C |
| 2,461,328 | 2/1949 | Landon .............................. | 236/95 X |
| 2,762,569 | 9/1956 | Caillol .................................. | 126/422 |
| 4,063,545 | 12/1977 | Hapgood .............................. | 126/419 |
| 4,119,087 | 10/1978 | Cook .................................... | 126/442 |

*Primary Examiner*—James C. Yeung
*Assistant Examiner*—Larry Jones
*Attorney, Agent, or Firm*—Alan Ruderman

[57] ABSTRACT

A solar water heating system having main solar panels for collecting heat from the sun and transferring the heat to water flowing through it from an inlet line to a storage tank. A control system is located to shut the flow of water and drain the system when the absorbed radiation by the panels is below a predetermined level and to commence the flow of water and shut the drain when the radiation level is above the predetermined level. The control includes a conduit for transferring heat from a main panel or an auxillary panel to a thermostat which acts to move a lever. The lever thereafter controls the opening and closing of a drain valve and an inlet water valve either directly or through other levers and connectors.

9 Claims, 4 Drawing Figures

CONTROL SYSTEM FOR SOLAR HEATER

BACKGROUND OF THE INVENTION

This invention relates to solar water heating systems for supplying potable heated water for utilization in homes and more particularly to a control system for turning on and shutting down the solar heating system in response to the solar energy available.

The reduced availability of conventional fuels and the resultant increase in their cost has brought forth a new look at the sun for supplying the necessary energy for heating of homes. The prior art is abound with solar collecting systems which generally had been recognized as cost effective only in geographical areas where the amount of solar radiation received was a maximum. Now, it is recognized that solar heat can be utilized almost anywhere to at least supply auxilary heat to a main system. The overall effieiency of the system does, however, depend on the available solar energy. In locations where seasonal or overnight outside temperatures are low, when the available solar energy level drops the efficiency of the solar system is nil. The energy in the system can be dissapated. When the outside temperature approaches or drops below the freezing point of water the water in the solar collector can freeze and destroy the system.

The prior art has recognized this problem. Closed systems have been proposed in which antifreeze is the working medium and transfers its heat to the water in a heat exchange. This entails expensive apparatus to ensure that there is no leakage of antifreeze into the potable water system. Other systems proposed use sophisticated costly electrical controls such as illustrated in U.S. Pat. Nos. 3,986,489 and 4,044,754. In the former a pump is controlled by the temperature differential between the water in the collector and the water in the tank to pump water only when the collector temperature is higher than that of the tank, but if the temperature of the water in the collector approaches freezing the pump must operate or use an auxillary electric heater in the collector. In the latter patent a sensor in the collector monitors the water temperature and controls solenoid valves electrically coupled thereto to drain the collector and shut off the supply thereto when the temperature approaches freezing. In these, as in any electrical system, the controls are only as good as the electrical power supplied thereto. In these times of frequent electrical outages and blackouts, a failure in the electrical power supplied to the controls will result in the destruction of the solar system on a subfreezing evening.

SUMMARY OF THE INVENTION

The present invention provides a solar water heating system that avoids many of the deficiencies inherent in the prior art. A simple control system is provided which utilizes the heat of a solar collection panel to activate the system and to shut the system when the panel is not absorbing sufficient energy. A purely mechanical system is utilized to automatically shut the flow of water from the storage tank and to open a drain valve to drain the system when the absorbed radiation level is low, e.g., when the sun goes down at night. When the absorbed radiation level increases to the point that the collector can effectively heat the water, the drain valve is shut and the inlet to the collector is opened.

The inherent deficiencies of electrical systems is eliminated by the use of the mechanical system. This system preferably is used in a thermosyphoning arrangement to eliminate the use of pumps required in other arrangements and thus provides a system that is completely passive and independent of electrical power. It therefore, does not require the expenditure of any energy other than that received from the sun. Moreover, the mechanical system for controlling the solar heater is comprised of simple relatively inexpensive components that may be added to present solar heating systems at a very small additional cost.

Consequently, it is a primary object of the present invention to provide a simple inexpensive yet effective control system for initiating and terminating the flow of water through a solar water heater in response to the level of solar energy received.

It is another object of this invention to provide a solar water heating system controlled by mechanical means in response to the heat received by a solar panel to turn the system on and to shut the system off.

It is a further object of this invention to provide a temperature activiated control system for a solar water heater for shutting the flow to the collector and opening a drain when the temperature of the collector panels is below a predetermined value and for closing the drain and commencing the flow when the temperature is above the value.

It is yet another object of this invention to provide a solar energy activated control system for moving a work producing member in response to the solar energy received by a solar collector panel.

BRIEF DESCRIPTION OF THE DRAWINGS

The particular features and advantages of the invention as well as other objects will become apparent from the following description taken in connection with the accompanying drawings, in which.

DESCRIPTION OF THE INVENTION

Figure 1:
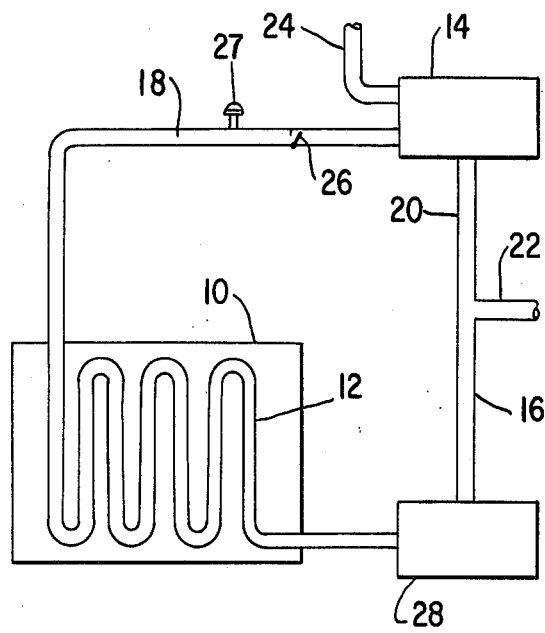
FIG. 1 is a diagrammatic representation of a solar water heating assembly incorporating a control system according to the present invention.

Referring to FIG. 1 a solar water heating system is illustrated diagrammatically for the sake of simplicity. Typically the system includes a solar collector 10 which may comprise one or more conventional solar panels having tubes 12 formed in a black plate for absorbing the radiation of the sun, a storage tank 14 and piping including an inlet line 16 and an outlet line 18. The inlet line 16 receives low temperature level water from the tank 14 through a pipe 20 and fresh cold water through a pipe 22 from a source (not illustrated) and communicates the water to the inlet of the collector. The outlet line 18 carries the hot water from the outlet of the collector to the tank where it is stored until drawn off through a pipe 24. In the preferred system the tank 14 is an auxillary tank which stores the heated water until required in a main water tank within the home. The collector is mounted outside the home to receive the sun's rays and the tank 14 may be mounted in a sheltered area which may be outside the home proper. As illustrated, the tank 14 is mounted above the collector and takes advantage of the thermosyphoning principle. Thus, with an elevational difference between the tank and the collector, water will flow upward to the tank as it is heated and as colder water flows into the lowermost portion of the collector and is gravitationally fed from the pipes 20 and 22. A one-way or check valve 26 is positioned in the line 18 to prevent back flow from the tank to the collector. An air relief valve 27 is placed in an upper portion of the line 18 on the tank 14 to speed the draining of the collector. The control system of the present invention is positioned within the inlet line 16 and is generally indicated in FIG. 1 at 28.

Figure 2:
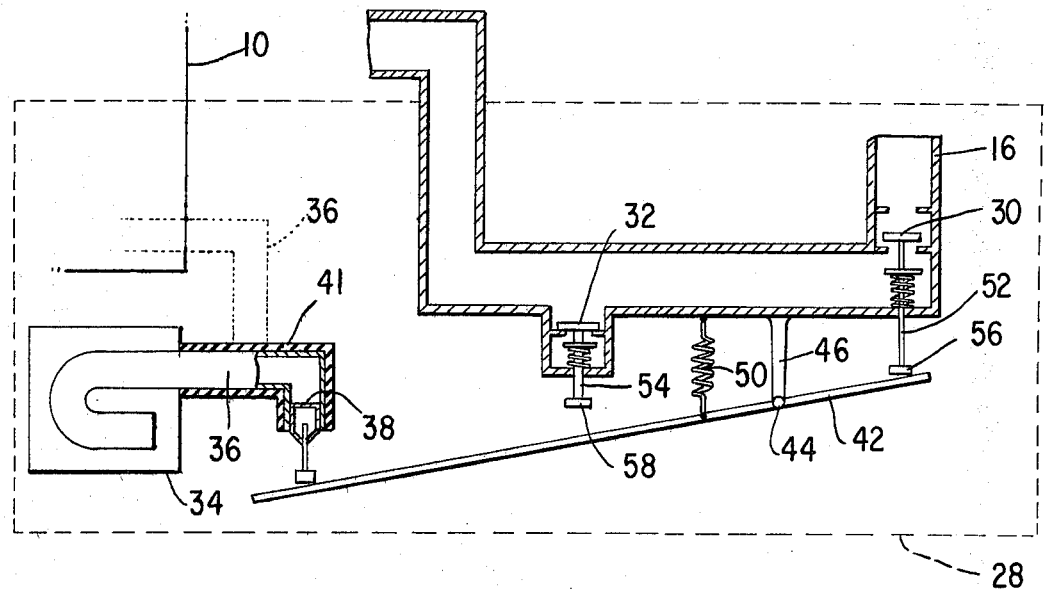
FIG. 2 is a diagrammatic representation of a first embodiment of a control system incorporating the principles of the present invention.

The control system functions to shut off the flow of water from the line 16 to the collector 10 and to drain the collector and a portion of the line 16 when the level of radiation from the sun is too low to provide effective heating of the water within the collector. This occurs principally during nighttime conditions or under circumstances where the cloud cover is very strong. It thus protects against freezing of the water when very low sub-freezing enviromental conditions are present. The control system also acts to re-start the flow of water through the collector when the radiation received by the sun is effective to heat the water. Thus, as illustrated in FIG. 2 the inlet line 16 includes an inlet valve 30 and a drain valve 32 controlled as hereafter described so that the inlet valve 30 closes before the drain valve opens and the drain valve closes before the inlet valve opens. When the inlet valve is closed and the drain valve open water within the collector will flow down to the drain valve, it being below the lowest point of the collector tubes, and flow out system. If the line is pitched down from valve 30 to valve 32 water between those points will also flow out the valve 32.

To control the opening and closing of the valves 30 and 32 the present invention provides a simple and inexpensive approach. Fastened to either the main collector panels 10 or to a small auxillary panel 34 provided for this purpose is one end portion of a conduit 36. The conduit comprises a good heat conductive material such as standard copper tubing and is fastened by soldering or other means giving a good transfer of heat from the appropriate panel to the tube. The auxillary panel 34 is preferred over the main panels for this purpose because it can be located to minimize the length of the tubing. It may be a simple metallic, e.g. copper or aluminum, plate painted black and may be in a frame covered with a sheet of plastic. The tubing may be coiled or bent at the fastened end as illustrated in FIG. 2 to give a greater heat transfer surface between the panel and the tubing. The other end of the tubing is fitted snugly about a thermostat 38 preferably of the type having a straight rod metallic element 40 linearly moveable within the casing of the thermostat. One thermostat which proved satisfactory is distributed by Dalen Products Inc. of Knoxville, Tennessee and had a one half inch full range movement from one quarter inch to three quarter inch. It begins extending at 68° F. and retracting at 72° F. The snug fit allows the transfer of heat from the tube to the thermostat. Thus, when the tube is heated by the transfer of heat from the panel 34 at one end, the heat is transfered to the other end and to the thermostat. The tube may be open at the panel end and air that is within the tube is thus heated and aids in the transfer of the heat to the thermostat. If a long distance is required between the panel 34, or the main panels 10 if used as a control panel, the tube may be filled with an antifreeze material and sealed at the panel end and sealed about the thermostate at the other end; the antifreeze would then provide the majority of the transfer of heat to the thermostat. In either event the tube 36 is preferably insulated with an insulation material 41.

The linear expansion and contration of the thermostatic element which appears as a linear movement of a pin 40 is applied to control the operation of the valves 30 and 32. In the embodiment of FIG. 2 a lever 42 is hinged at 44 on a bracket 46 clamped or otherwise fastened to a fixed member such as the pipe 16. The lever is positioned and sized so that one leg thereof is engageable with the end 48 of the thermostatic element 40. A spring 50 may be fastened to the same member, i.e. pipe 16 as the bracket 46 to bias the lever against the element 40. Alternatively, other means such as a weight (illustrated only in regard to the embodiment of FIG. 3) may be used in lieu of the spring. Each valve 30 and 32, as illustrated, is normally closed by the pressure of the water flowing in the pipe 16 but can be aided by springs and includes a respective stem 52 and 54 attached to the valve head at one end and extending out the exterior of the valve body at the other. The ends of the valves are positioned such that the lever 42 makes little or no contact with the free end of the stem 52 when the thermostatic element 40 is in its retracted position, and makes little or no contact with the free end 58 of the stem 54 when the element 40 is fully extended. Thus, when the thermostat is heated and the element 40 extends, the valve 32 closes and the valve 30 opens. Similarly, when the element retracts, the valve 30 closes and the valve 32 opens to drain the collector 10 and the pipe 16 downstream of the valve 30. With proper positioning of the lever, thermostat, and valves, and sizing of the valve stems, the valve 30 will close before the valve 32 opens, and the valve 32 will close before the valve 30 opens. This can easily occur if the free end 56 of valve stem 52 does not engage the lever when element 40 is retracted, and the free end 58 of stem 54 does not engage it when element 40 is extended and the extremes of movement of the valve stems are less than that of element 40.

Figure 3:
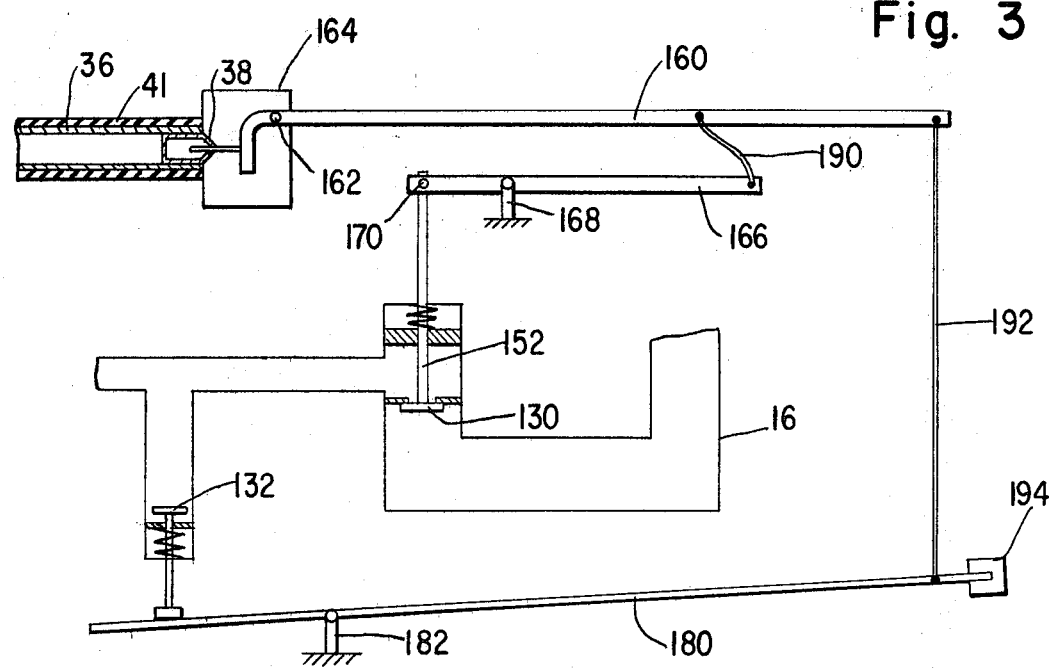
FIG. 3 is a diagrammatic representation of a second embodiment of the control system.

A modification of the control system is illustrated in FIG. 3, which is similar to that of the first embodiment. Here a three lever system is used, one controlled by the thermostat, and one to control each valve. A first lever 160 is a bellcrank pivotably connected at 162 to a bracket 164 fastened to a fixed member. A second lever 166 is hinged to another fixed bracket 168 and has the end of stem 152 of inlet valve 130 pivoted thereto at 170. A third lever 180 is hinged to a fixed bracket 182 for engagement with the drain valve 132. The lever 160 controls the movement of the levers 166 and 180 through respective flexible connectors 190 and 192 which are connected between the lever 160 and the respective lever 166 and 180. The connectors 190 and 192 may be chains connected at locations so that a greater moment is applied to lever 180 then lever 160. The chain 192 being more taunt than chain 190 so that the drain valve 132 will close before inlet valve 130 opens, and the inlet valve 130 will close before the drain valve 132 opens. A weight 194 may be applied to the end of the lever 180 for the same purpose as the spring 50 in the first embodiment. The thermostat controls the movement of the lever 160 which controls the levers 166 and 180, and in all other respects this modification functions like the embodiment of FIG. 2.

Figure 4:
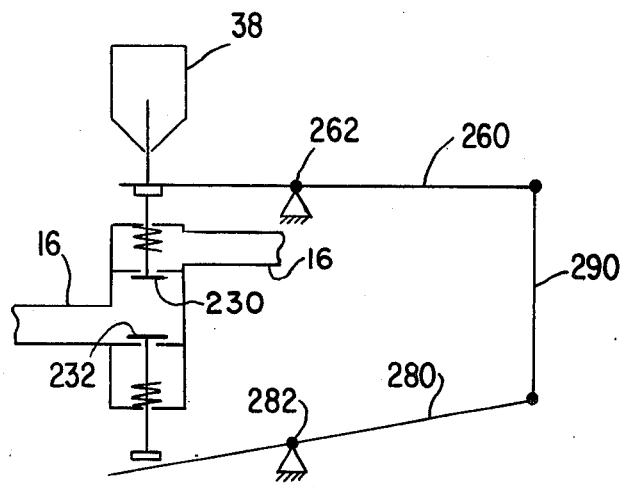
FIG. 4 is a schematic representation of a third embodiment of the control system.

In FIG. 4, a third alternative is illustrated schematically as having a first lever 260 pivotably hinged at 262 and acted upon by the thermostat to directly control inlet valve 230. The drain valve 232 is moved by a second lever 280 pivoted at 282. A third lever or a flexible connector 290 is connected between the levers 260 and 280 to control the movement of the lever 280. When the thermostat is heated the lever 260 acts to shut valve 232 and open valve 230 and, when cooled, to shut valve 230 and open valve 232.

Numerous alterations of the structure herein disclosed will suggest themselves to those skilled in the art. However, it is to be understood that the present disclosure relates to the preferred embodiments of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A solar energy activated mechanical control system for a solar water heater comprising, first solar collector means for holding water to be heated, a water storage tank, input means including a conduit communicating said storage tank and collector means for supplying water at a first temperature level to said collector means, inlet valve means between said input means and said collector means, output means communicating water at a second and higher temperature level from said collector means to said storage tank, drain valve means communicating with the water in said collector means for draining said collector means when open, second solar collector means, a thermostat including a temperature responsive thermostatic element movable between a first position when at a first temperature level and a second position when at a second temperature level, a thermal heat conducting conduit fastened to said second solar collecting means and to said thermostat for transfering heat therebetween, pivotably mounted lever means forcibly acted upon by said thermostatic element for pivoting in a first direction when said element moves from said first position to said second position and for pivoting in a second direction when said element moves from said second position to said first position, and operator means movable by said lever means for acting on said inlet valve means and said drain valve means for closing said drain valve means and opening said inlet valve means when said lever means pivots in said first direction and for closing said inlet valve means and opening said drain valve means when said lever means pivots in said second direction.

2. A temperature activated control system as recited in claim 1 wherein said second collector means comprises a portion of said first collector means.

3. A temperature activated control system as recited in claim 1 wherein said first collector is disposed at a lower elevation than said storage tank, and said output means includes a check valve allowing water to flow from said collector means to said tank only.

4. A temperature activated control system as recited in claim 1 wherein said thermostatic element is linearly movable between said first and second positions.

5. A temperature activated control system as recited in claim 1 or claim 4 wherein said thermal heat conducting conduit comprises a metallic tube joined to said second solar collecting means.

6. A temperature activated control system as recited in claim 1 wherein said inlet valve means and said outlet valve means are normally closed, each of said valve means having a depressibly activated stem for opening the valve.

7. A temperature activated control system as recited in claim 6 wherein each of said valve means includes a valve head, one end of said stem being fastened to said head, the other end of said stem extending from said valve means, said operator means comprising said other ends of said stems.

8. A temperature activated control system as recited in claim 6 wherein said operator means comprises, second pivotable lever means for engaging the stem of said inlet valve means, third pivotable lever means for engaging the stem of said drain valve means, and means interconnecting said first lever means with said second and third lever means.

9. A temperature activated control system as recited in claim 7 wherein said operator means includes a second pivotable lever means, for first lever means being disposed for pivoting into engagement with said other end of said inlet valve means, said second lever means being disposed for pivoting into engagement with said other end of said drain valve means, and means interconnecting said first and second lever means.

* * * * *